July 14, 1959  M. L. PERSINGER ET AL  2,894,447
PORTABLE BARBECUE
Filed Dec. 9, 1955  2 Sheets-Sheet 2
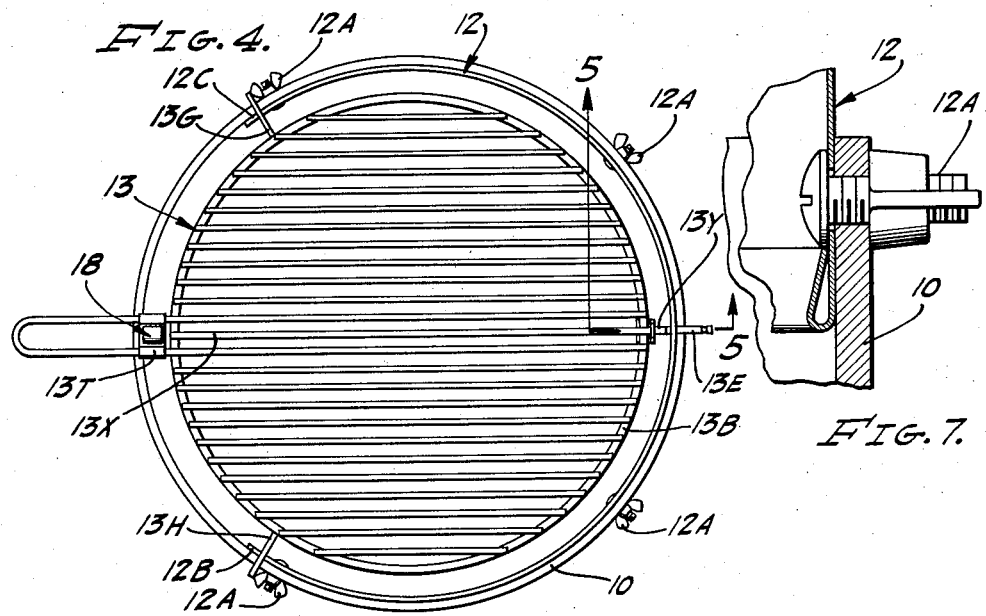
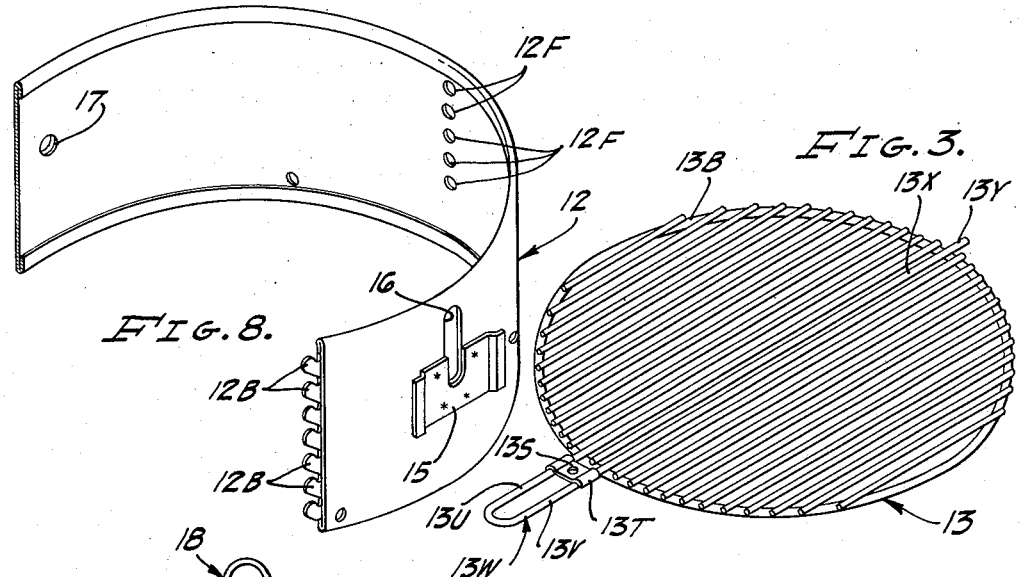
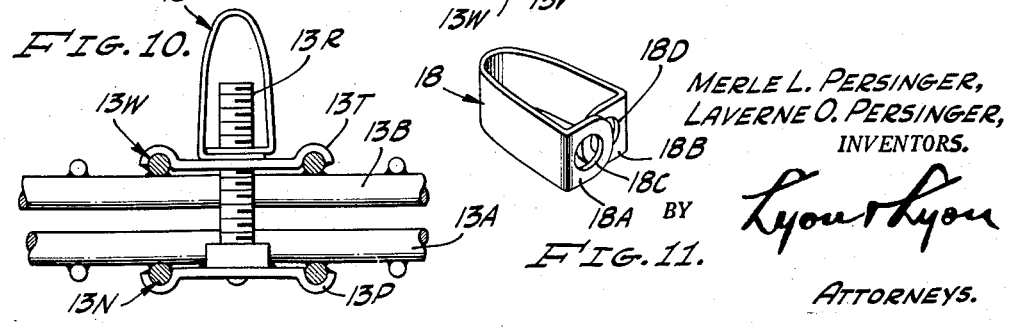
MERLE L. PERSINGER,
LAVERNE O. PERSINGER,
INVENTORS.
BY Lyon & Lyon
ATTORNEYS.

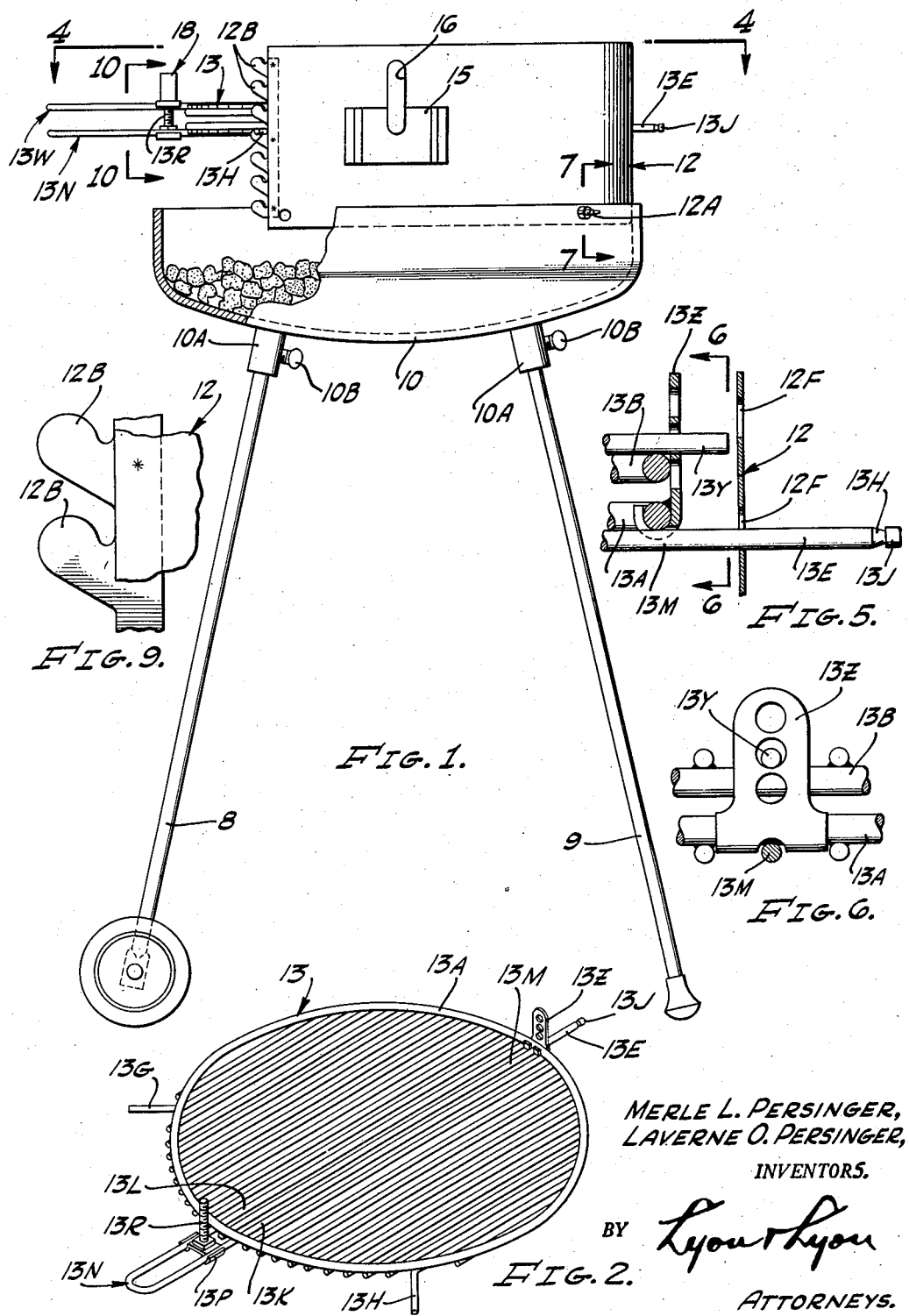

United States Patent Office 2,894,447
Patented July 14, 1959

2,894,447

PORTABLE BARBECUE

Merle L. Persinger, Glendale, and Laverne O. Persinger, Burbank, Calif.

Application December 9, 1955, Serial No. 552,113

6 Claims. (Cl. 99—398)

The present invention relates to an improved portable barbecue.

The main object of the present invention is to provide a portable barbecue having features whereby the barbecued food may be conveniently handled and conveniently positioned in the most advantageous position for best cooking.

A specific object of the present invention is to provide a barbecue having a grill which may be maintained in a plurality of adjustable positions with the plane of the grill being level at different heights or cocked at different angles.

Another specific object of the present invention is to provide a barbecue of this character having these features and yet which is relatively inexpensive to manufacture.

Another specific object of the present invention is to provide an improved grill structure.

Another specific object of the present invention is to provide a portable barbecue in which the various parts may be quickly and easily disassembled and assembled for cleaning purposes.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1 is a view in side elevation of a portable barbecue embodying features of the present invention with food clamped in the grill;

Figure 2 is a perspective view of one of the elements shown in Figure 1;

Figure 3 is a perspective view showing the other one of the two elements of the grill;

Figure 4 is a top plan view taken in the direction indicated by the arrows 4—4 in Figure 1;

Figure 5 is a sectional view taken on the line 5—5 of Figure 4;

Figure 6 is a view taken on the line 6—6 of Figure 5;

Figure 7 is a sectional view taken on the line 7—7 of Figure 1;

Figure 8 is a perspective view of a portion of the hood with the lefthand portion thereof in Figure 8 shown broken away;

Figure 9 is a fragmentary view showing in enlarged form a portion of the hood;

Figure 10 is a view taken in the direction indicated by the arrows 10—10 in Figure 1; and Figure 11 is a perspective view of the releasable fastening element shown in Figure 10.

The barbecue includes a metal fire bowl 10 supported on two wheeled legs 8 and a third leg 9, said legs having their upper ends disposed in sockets 10A and clamped therein by clamping screws 10B.

A curved stationary steel screen 12 is releasably secured to the upper rim of the fire bowl 10 and inside of the bowl 10 by the four screw and wing nut arrangements 12A.

This screen 12, in turn, supports in different adjustable positions the grill 13, such grill 13 comprising a pair of members 13A and 13B which are releasably secured together to sandwich food therebetween.

An important feature is that such grill 13 may be maintained in a plurality of adjustable positions, with the plane of the grill being level at different heights and/or cocked at different angles.

The structure which allows such multiplicity of adjustments resides in the provision of a plurality of holes 12F which are disposed in a vertical line on the central portion of the screen 12, into which the extended rod portion 13E of the grill may extend, together with the plurality of hooks 12B and 12C (Fig. 4) on opposite edges of the curved screen 12, such hooked portions being engageable with the bent rod extensions 13G and 13H, respectively, of the grill 13.

The rod 13E is sufficiently prolonged such that the grill, once it is positioned as illustrated in Figures 1 and 4, may be moved to the left to clear the hooked portions 12B and 12C so that the composite grill 13 may be turned through 180° with the particular apertured portion 12F into which the rod extension 13E is disposed, serving as a bearing.

In order to prevent the grill from being pulled out entirely in the above operation, the extension 13E is provided with an annular conical shaped grooved portion 13H which is contiguous with the rod end 13J, serving as a stop member. The diameter of the rod end 13J which is the diameter of the extension 13E is sufficiently smaller however than the diameter of any one of the apertures 12F, so that if desired, by lifting the grill slightly and pulling it sufficiently, the grill may be removed completely and then placed in a different adjusted position with the extension 13E engaging a different apertured portion 12F and, of course, the hooked extensions 13G and 13H being engageable with hooked portions 12B and 12C on the screen.

The bracket 15, apertured portions 16 and 17 on the screen, are for purposes of mounting a spit of conventional structure. In such case, a motor driven spit of conventional structure is so mounted that the spit passes through the apertured portions 16 and 17, with one end of the spit being mounted in the apertured portion 17 and the other end of the spit being supported in the driven part of a conventional motor assembly which is supported on bracket 15.

It is noted that the grill 13 includes two planar elements 13A and 13B, each being formed generally by parallel extending spaced rods having their ends affixed to a circular rod as, for example, by welding or brazing.

Observing the grill element 13A in more detail, it is noted that two of the parallel rods are extended and bent to provide the aforementioned hooked portions 13G and 13H. Also, the central rod 13M is extended to provide the extended rod portion 13E. Also, the two rod portions 13K and 13L, on opposite sides of the central rod portion, are extended and joined by a U-shaped bend to provide a convenient handle 13N. These rod portions 13K and 13L are bridged by a strap 13P which has affixed thereto a clamping bolt 13R. The elements 13N, 13P and 13R are brazed or welded together in a unitary structure. This clamping bolt 13R passes through an apertured portion 13S in the strap 13T which bridges the two rods 13U and 13V. These rods 13U and 13V are also prolonged and poined by a U-shaped bend to provide a like handle portion 13W. The central rod 13X of the grill member 13B is sufficiently prolonged to provide a stop member 13Y which may abut against the inner wall of the hood or screen 12 to center the grill, as well as for a purpose now described.

As clearly shown in Figure 2, the grill member 13A has an apertured bracket member 13Z extending upwardly from the periphery thereof, with the apertured portions being vertically disposed and of sufficient diameter so that the extended rod portion 13Y be projected through any one of such apertured portions, to thereby provide adjustable spacing between the two planar grill members 13A and 13B, depending upon the thickness of the food, for example steaks or hamburgers, to be cooked.

The two grill members 13A and 13B are maintained together by the fastening element 18 which is a special form of nut and serves as a clamping element to clamp the food between the two grill members 13A and 13B. The fastening element 18 is of bendable sheet stock material which is bent in the form of a U with the end portions 18A and 18B bent inwardly and provided with alignable apertured portions 18C and 18D.

Using this construction, it is noted that the food may be conveniently handled once it is clamped in the grill; and, in fact, different portions of the food may be subjected to different degrees of heat by adjustment of the grill on the screen 12, and, indeed, this adjustment may be such as to compensate for uneven temperature zones that may be present in the fire bowl 10, which, when cooking, is full of hot coals. For example, the operator has a choice as to which particular aperture portion 12F, or hook 12B, or hook 12C he uses for supporting the grill horizontally at many different chosen elevations with respect to the fire bowl; or limiting himself to one such apertured portion 12F, the operator may use any one of the hooks 12B, 12C, to support the grill at many different chosen angles of inclination with respect to the horizontal plane. Also, the grill with the food clamped in the grill may be conveniently carried as an assembly either before or after the food is cooked from the place the food is prepared and the grill is assembled to where the food is ultimately consumed without carrying additional handling equipment such as forks, platters and the like. The grill also serves as a convenient carrying element for the uncooked and cooked food.

The clamping element 18 provides quick and easy assembly and separation of the grill members. Thus, in assembly, the legs of the fastening element are squeezed together to align the apertured portions 18C and 18D to allow the screw-threaded portion 13R to pass therethrough. The element 18 is then moved into engagement with the strap 13T and then released to allow the legs of the element 18 to spring outwardly and be secured to the screw 13R. To remove the element 18, the legs are squeezed together and the element moved in the longitudinal direction of the screw 13R without turning.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A barbecue comprising a fire bowl having a peripheral edge, a screen secured on said peripheral edge, said screen having a pair of spaced edge portions, a plurality of hooks mounted on each of said edge portions, the central portion of said screen having a plurality of spaced apertured portions therein, a grill mounted on said screen and having a pair of spaced hook portions engaging said screen hooked portions, and said grill having an extended rod portion engaging one of said screen apertured portions.

2. A barbecue comprising a generally circular screen having a pair of spaced edge portions, a plurality of hooked members mounted on each of said edge portions, said screen having its central portion apertured to provide a plurality of apertures, a grill mounted on said screen and having hook portions engaging said screen hooked portions and having an extended rod portion engaging one of said screen apertured portions.

3. A barbacue comprising a screen having a pair of spaced edges, a plurality of spaced fastening means at each of said edges and extending outwardly from said edges as prolongations of said edges of said screen, said screen having a central portion with a plurality of supporting elements therein, a grill mounted on said screen, said grill having an extended portion engaging said supporting elements and having fastening means engaging said fastening means on said screen.

4. A barbecue grill comprising a pair of planar elements releasably secured together, each of said planar elements having a peripheral member to which opposite ends of a plurality of spaced parallel extending elements are affixed, one of said grill elements having a bracket extending upwardly from its peripheral portion, said bracket having a plurality of apertured portions therein, the other one of said grill elements having an extended rod portion engageable with a selected one of said apertured portions, and means clamping said members together, said means including said bracket and said extended rod portion engaging said selected apertured portion, said clamping means including a threaded rod on one of said planar elements passing upwardly through an apertured portion in the other of said planar elements, said threaded rod extending generally perpendicular to the planes of said planar elements, and a U-shaped resilient fastening element having alignable apertured portions engaging said threaded rod and contacting said other planar element and contacting said extended rod portion in said selected apertured portion.

5. A barbecue arrangement comprising a firebowl having a peripheral edge, a screen on said peripheral edge, said screen having a pair of spaced-edge portions, the central portion of said screen having a plurality of spaced apertured portions therein, a grill mounted on said screen and having a pair of elements engaging said screen edge portions, said grill having an extended rod element engaging one of said screen apertured portions, said grill comprising a pair of planar elements releasably secured together, each of said planar elements having a periphery to which opposite ends of a plurality of spaced parallel extending elements are affixed, one of said grill planar elements having a bracket extending upwardly from its peripheral portion, said bracket having a plurality of apertured portions therein, the other one of said grill planar elements having an extended rod portion engaging a selected one of said bracket apertured portions, means clamping said planar elements together, said means including said bracket and said extended rod portion engaging a selected bracket apertured portion.

6. A barbecue comprising a pair of planar grill elements releasably secured together, each of said planar elements having a peripheral member to which opposite ends of a plurality of spaced parallel extending elements are affixed, one of said grill elements having a bracket extending upwardly from its peripheral portion, said bracket having a plurality of apertured portions therein, the other one of said grill elements having an extended rod portion engaging a selected one of said apertured portions, means clamping said grill elements together, said means including said bracket and said extended rod portion engaging said selected apertured portion, a generally annular screen supporting said grill elements and having a pair of spaced-edges, a plurality of vertically spaced fastening means on each of said edges, said screen having a central portion with a plurality of vertically spaced holes therein, one of said grill elements having an extended rod portion engaging a selected one of said vertically extended holes, said one grill element having a pair of rods extending outwardly thereof and engaging a corresponding pair of said spaced fastening means on the edges of said screen.

References Cited in the file of this patent

UNITED STATES PATENTS

| | | |
|---|---|---|
| 398,493 | Caller | Feb. 26, 1889 |
| 1,279,237 | Bourcheix | Sept. 17, 1918 |
| 1,448,148 | O'Kane | Mar. 13, 1923 |
| 1,711,778 | Elbert | May 7, 1929 |
| 1,985,754 | Wiley | Dec. 25, 1934 |
| 2,058,172 | Myers | Oct. 20, 1936 |
| 2,556,365 | McKnight | June 12, 1951 |
| 2,608,190 | Winning et al. | Aug. 26, 1952 |
| 2,627,854 | Sava | Feb. 10, 1953 |
| 2,708,925 | Cordrey | May 24, 1955 |
| 2,797,633 | Goodwin | July 2, 1957 |